United States Patent

[11] 3,620,860

[72] Inventors Carl R. Eckardt
 Morris Plains;
 Oliver Alfred Barton, Florham Park; Ralph Milton Hetterly, Morristown, all of N.J.
[21] Appl. No. 771,634
[22] Filed Oct. 29, 1968
[45] Patented Nov. 16, 1971
[73] Assignee Allied Chemical Corporation
 New York, N.Y.

[54] BONDING METALS WITH CHLORINATED ETHYLENE POLYMERS
 12 Claims, No Drawings
[52] U.S. Cl. .................................................. 156/247, 156/332, 156/333, 156/344, 29/424, 29/427, 260/87.3, 260/94.9 H
[51] Int. Cl. ........................................................... C09j 3/14, B32b 31/18
[50] Field of Search ............................................. 156/333, 332, 344, 247; 260/94.9 H, 94.7 HA, 87.3; 29/424, 427

[56] References Cited
UNITED STATES PATENTS

| | | | |
|---|---|---|---|
| 2,735,763 | 2/1956 | Heath.......................... | 156/344 X |
| 2,779,754 | 1/1957 | Erchak........................ | 260/94.9 |
| 3,049,455 | 8/1962 | Werkman et al. ............ | 156/333 |
| 3,084,426 | 4/1963 | Hugo et al. .................. | 29/418 |
| 3,114,201 | 12/1963 | Boccaccio et al............ | 29/424 |
| 3,162,871 | 12/1964 | Powers........................ | 29/424 X |
| 3,399,091 | 8/1968 | Cornay et al. ................ | 156/71 |
| 3,414,556 | 12/1968 | Bungo et al.................. | 260/94.9 |
| 3,312,678 | 4/1967 | Crano.......................... | 260/93.5 |
| 3,398,046 | 8/1968 | Fowler et al. ................ | 161/218 |

Primary Examiner—Carl D. Quarforth
Assistant Examiner—E. A. Miller
Attorneys—Arthur J. Plantamura and Herbert G. Burkard ABSTRACT: This invention relates to a method for bonding substrates together by use of certain chlorinated polymers of ethylene. The substrates thus bonded are readily separated from each other.

BONDING METALS WITH CHLORINATED ETHYLENE POLYMERS

It is an object of this invention to provide a method of bonding together substrates of certain hereinafter described materials.

It is a further object of this invention that the bonded substrates be capable of being readily separated.

In accordance with the present invention we have found that certain hereinafter-defined chlorinated polymers of ethylene when melted between two substrates of suitable material and then allowed to cool below their melting points will bond the two substrates together. These substrates may later be readily separated by heating the substrate assembly to a temperature above the melting point of the chlorinated polymer and separating the substrates from each other. This procedure can be performed using more than two substrates so that the assembly will contain a substantial number of substrates bonded together. The chlorinated polymers useful in this invention are fully solid at room temperature.

The chlorinated polymers used in the practice of the instant invention are:

1. The chlorinated polyethylene —$C_1$ to $C_8$ alkanol acetate described in copending and commonly assigned U.S. application Ser. No. 425,348 filed Jan. 13, 1965, now abandoned.

2. The chlorinated polyethylene —$C_1$ to $C_8$ alkanol telomers described in copending and commonly assigned U.S. application Ser. No. 727,672 filed May 8, 1968, now abandoned.

The chlorinated copolymers of ethylene and vinyl acetate before chlorination contain from about 5 percent to about 30 percent by weight of vinyl acetate and have a maximum molecular weight of 40,000. After chlorination, the copolymers contain from about 4 to about 40 weight percent of chlorine, said chlorine being attached predominately to the polyethylene portion of the copolymer with blocks of polyethylene in the chlorinated copolymer being unchlorinated.

The process for preparing the above-defined chlorinated copolymer is fully detailed in the previously cited U.S. application Ser. No. 425,348. Briefly, the process comprises introducing substantially oxygen-free chlorine gas at a constant rate of up to 1 pound of chlorine per 1 pound of copolymer per hour into a reactor containing an aqueous slurry of finely divided particles of polyethylene-vinyl acetate copolymer. The temperature during chlorination can be from about 20° C. to about 70° C. No chlorination catalyst or initiator is required for this process.

The polyethylene-vinyl acetate copolymer can be produced by methods known to those skilled in the art, one such method being described in the above-cited U.S. application Ser. No. 425,348.

The chlorinated polyethylene —$C_1$ to $C_8$ alkanol telomers have a molecular weight of no greater than about 9,000, a chlorine content of from about 5 percent to about 45 percent by weight, a melting point of from about 95° C. to about 110° C. and a crystallinity of from about 10 percent to about 50 percent. Preferably, the alkanol is isopropanol.

The process for chlorinating the above-defined telomer is fully detailed in the previously cited U.S. application Ser. No. 727,672. Briefly the process comprises adding substantially oxygen-free chlorine gas to an aqueous slurry containing up to 22 weight percent of a particulate polyethylene $C_1$ to $C_8$ alkanol telomer having a molecular weight of no greater than about 5,000, a melting point ranging of from about 100° C. to about 125° C. and a crystallinity ranging from about 20 percent to about 60 percent. The slurry is maintained at a temperature of from about 25° C. to about 90° C. during the chlorine addition.

The polyethylene-alkanol telomers can be produced by methods known to those skilled in the art, one such method being described in the above-cited U.S. application Ser. No. 727,672.

The substrate materials which are suitable for use in this invention are those which will bond with the chlorinated polymers of this invention and will not be degraded or damaged by exposure to a temperature slightly above the melting point of the chlorinated polymer used to bond the substrates. Suitable classes of substrate materials are metals, such as aluminum, copper, and cold rolled steel; cellulosic materials such as wood, having charring temperatures above the melting point of the chlorinated polymer; and plastics which are structurally and chemically stable at temperatures slightly above the melting point of the chlorinated polymer. The suitability of specific materials within the above classes may be best determined by testing the specific materials. Other classes of materials will be obvious to those skilled in the art.

The substrates to be bonded together may each be of the same material or may each be of different materials.

The substrates to be bonded are first degreased by, for example, wiping their surfaces with a solvent. The chlorinated polymer is then applied to one of the surfaces by any of the following methods:

a. The polymer is dusted onto the substrate surfaces as a powder. The amount of polymer required varies with the particular polymer and substrate used. An average amount is about 0.04 pound of polymer per square foot of bonded surface for each 1 mil thickness of bond.

b. The polymer is dissolved in a suitable solvent and applied to the substrate by conventional methods such as brushing or spraying and the solvent is then evaporated. A suitable solvent is one which will dissolve the particular chlorinated polymer while not adversely affecting the substrate to which the polymer solution is being applied. Examples of suitable solvents for metal substrates are toluene and xylene. These and other possible solvents should be tested on the substrate materials before being used.

c. Another alternative is for the polymer to be melted first and then applied to the substrate to the desired thickness. Application of the melted polymer to the substrate may be by roller, doctor blade, or other means known to those skilled in the art.

The polymer coated substrate is covered with a second substrate. With above methods (a) and (b), the polymer coated substrate is heated to a temperature sufficient to melt the chlorinated polymer and such heating may be done either before or after covering with the second substrate. The polymer is then solidified by cooling the substrate assembly to a temperature below the melting point of the polymer.

During the heating and cooling steps pressure may be applied perpendicular to the bonding surfaces, as by a press, to insure good contact between the molten polymer and the substrates. Too high a pressure must be avoided, however, so as to prevent the polymer from being squeezed out from between the two substrates and causing inadequate bonding. The final thickness of the polymer bond should be from about 0.5 mil to about 10 mils, preferably from about 2 mils to about 5 mils.

This process may also be used to bond a substantial number of sheets together at the same time, rather than only two at a time as outlined above.

An assembly formed by the methods of the instant invention can be readily separated into its individual substrates by heating to a temperature above the melting point of the chlorinated polymer and then sliding the substrates apart. Any polymer adhering to the substrates can be cleaned off by using one of the above-defined suitable solvents.

Also, the bonds between the individual substrates can be broken by soaking the substrate assembly in one of the previously defined suitable solvents, or by chilling the assembly to a temperature below the brittle temperature of the polymer which is generally below −10° C. and then exerting a shearing force on the substrate-polymer interface, as by striking the interface with a hammer.

The process of this invention is particularly useful for temporarily bonding together several metal sheets so that certain machine operations, such as shaping or drilling, can be performed on all sheets at one time as a unit, after which the machined sheets can be readily separated.

EXAMPLE 1

Aluminum strips 1 inch × 4 inches, were cleaned with xylene, coated with a 6 ml. thick layer of polyethylene-alkanol telomer over a 1-square-inch area and lap-bonded with another 1-inch × 4-inch aluminum strip by heating the telomer to 120° C. (10° C. above its melting point) and then cooling the assembly to room temperature under a pressure of 50 p.s.i.

The finished assembly was pulled in an Instron machine at 0.5 in./min. (Mil.Sepc. A-8331). Results are tabulated below:

| Testing Temperature, °C. | Pull Required, p.s.i. |
|---|---|
| 0 | 225 |
| 25 | 134 |

The polyethylene-alkanol telomer used to bond the aluminum strips had the following properties:

| | |
|---|---|
| Weight % chlorine | 41.2 |
| % Crystallinity | 20.0 |
| Melting point, °C. | 110 |
| Approximate average molecular weight | 6000 |

EXAMPLE 2

Sheets of substrate metal, approximately 1 inch × 4 inches were cleaned with toluene, coated with a powder of polyethylenevinyl acetate copolymer, covered with another sheet of the same metal and then heated to a temperature above the melting point of the copolymer and held there for 3 minutes. The assembly was then cooled to room temperature. The copolymer contained about 17 weight percent vinyl acetate.

Tensile shear of the assembly was determined by the test outlined in ASTM Test D-1002, modified as follows:
  a. 1 square inch of the 1-inch × 4-inch metal sheets was covered with polymer
  b. the assemblies thus prepared were pulled in an Instrom machine in the usual manner at 73° F. and 50 percent R.H.

The copper sheets used were 99.9 percent minimum copper with 0.04 percent oxygen.

The cold rolled steel had the following composition:

| | |
|---|---|
| Carbon | 15-20% |
| Manganese | 71-76% |
| Phosphorous | 4% |
| Sulfur | 5% |

Results:

| Substrate Metal | Wt. % Chlorine in Polymer | Bond Thickness/ mil | Tensile Shear, p.s.i. |
|---|---|---|---|
| Aluminum 2024T3 | 5.6 | 2.0 | 72 |
| Aluminum 2024T3 | 33.4 | 1.0 | 303 |
| Aluminum 2024T3 | 33.4 | 2.0 | 760 |
| Stainless Steel Type 304 | 5.6 | 0.5 | 190 |
| Stainless Steel Type 304 | 33.4 | 0.5 | 392 |
| Copper | 5.6 | 0.5 | No Bond |
| Copper | 33.4 | 0.5 | 556 |
| Cold Rolled Steel | 5.6 | 0.5 | 180 |
| Cold Rolled Steel | 33.4 | 0.5 | 734 |

EXAMPLE 3

The substitution of other substrate materials, such as wood and thermosetting plastics for the substrate materials in examples 1 and 2 give similar results although values for bond strength will be different than in example 1 and 2.

We claim:
1. A method of bonding together metallic substrate materials comprising
   a. applying a normally solid chlorinated polymer to a metallic substrate surface, said chlorinated polymer being selected from the group consisting of chlorinated copolymers of ethylene and vinyl acetate and chlorinated polyethylene $-C_1$ to $C_8$ alkanol telomers, wherein said chlorinated copolymers before chlorination contain from about 5 percent to about 30 percent by weight of vinyl acetate and have a maximum molecular weight of 40,000 and after chlorination contain from about 4 percent to about 40 percent by weight of chlorine, said chlorine being attached predominately to the ethylene derived portion of the copolymer; and wherein said chlorinated alkanol telomers have a maximum molecular weight of about 9,000, a chlorine content ranging from about 5 percent to about 45 percent by weight, a melting point ranging from about 95° C. to about 110° C. and a crystallinity ranging from about 10 percent to about 50 percent,
   b. covering the chlorinated polymer with a second metallic substrate,
   c. melting the chlorinated polymer, and
   d. resolidifying the chlorinated polymer.
2. The method of claim 1 wherein the chlorinated polymer is melted before being applied to the substrate surface.
3. The method of claim 1 wherein the chlorinated polymer is melted after being applied to the substrate surface but before being covered with the second substrate.
4. The method of claim 1 wherein pressure is applied perpendicular to the bonding surfaces during the melting step.
5. The method of claim 1 wherein pressure is applied perpendicular to the bonding surfaces during the cooling step.
6. the method of claim 1 wherein the final thickness of the chlorinated polymer bond is from about 0.5 mils to about 10 mils.
7. The method of claim 1 wherein the final thickness of the chlorinated polymer bond is from about 2.0 mils to about 5.0 mils.
8. The method of claim 1 wherein the bonded substrates are later separated from each other.
9. The method of claim 8 wherein the bonded substrates are separated from each other by melting the chlorinated polymer and separating the substrates.
10. The method of claim 8 wherein the bonded substrates are separated from each other by chilling the bonded substrates to a temperature below the brittle temperature of the chlorinated polymer and then exerting a shearing force on the substrate-polymer interface sufficient to break the bond.
11. The method of claim 1 wherein the bonded substrates are machined as a unit and then separated from each other.
12. The method of claim 11, wherein the metal substrates are selected from the group consisting of aluminum, copper, and cold rolled steel.

* * * * *